(12) United States Patent
Chaplin et al.

(10) Patent No.: US 9,996,137 B2
(45) Date of Patent: Jun. 12, 2018

(54) ENABLING DEEP SLEEP AND POWER SAVING THROUGH L1 SIGNALING ON STACK INTERFACE

(71) Applicant: Cisco Technology, Inc., San Jose, CA (US)

(72) Inventors: Daniel Lee Chaplin, Cedar Park, TX (US); Stephen Patrick Kolecki, Austin, TX (US); Krishna Kumar Vavilala, Bangalore (IN); Chris Desiniotis, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 143 days.

(21) Appl. No.: 14/810,865

(22) Filed: Jul. 28, 2015

(65) Prior Publication Data

US 2017/0031421 A1 Feb. 2, 2017

(51) Int. Cl.
*G06F 1/32* (2006.01)
*H04L 12/12* (2006.01)
*H04W 52/02* (2009.01)

(52) U.S. Cl.
CPC ............ *G06F 1/3209* (2013.01); *H04L 12/12* (2013.01); *H04W 52/0229* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 2005/0025067 A1* | 2/2005 | Jones ...................... | H04L 12/24 370/254 |
| 2012/0120958 A1* | 5/2012 | Mahadevan ............ | H04L 12/12 370/392 |
| 2013/0205155 A1* | 8/2013 | Yang ...................... | G06F 1/3234 713/323 |
| 2015/0169033 A1* | 6/2015 | Shukla .................. | G06F 1/3234 713/320 |

* cited by examiner

*Primary Examiner* — Kim Huynh
*Assistant Examiner* — Joshua Neveln
(74) *Attorney, Agent, or Firm* — Patterson + Sheridan, LLP

(57) ABSTRACT

Embodiments generally provide techniques for waking up a plurality of network devices from a power saving mode via layer 1 (L1) signaling. Embodiments include entering a power saving mode at a first network device, wherein logic for processing layer 2 and higher data is inactive during the power saving mode and receiving, while the first network device is in the power saving mode, a L1 bit stream from a second network device connected to the first network device. Additionally, embodiments include, upon determining that a predefined code is present within the received L1 bit stream, exiting the power saving mode at the first network device and transmitting a second L1 bit stream containing the predefined code to a third network device.

18 Claims, 8 Drawing Sheets

US 9,996,137 B2

ENABLING DEEP SLEEP AND POWER SAVING THROUGH L1 SIGNALING ON STACK INTERFACE

TECHNICAL FIELD

Embodiments presented in this disclosure generally relate to computer networks, and more specifically, embodiments disclosed herein relate to techniques and apparatus for waking up network devices via layer 1) signaling.

BACKGROUND

A computer network, in general, allows two or more devices interconnected by communication links and subnetworks to exchange information and/or share resources. The devices may serve as end stations where data is typically originated or terminated in the computer network or serve as intermediate stations where data is typically routed to other devices (e.g., intermediate stations, end stations, etc.) and/or subnetworks in the computer network. Examples of intermediate stations include routers, bridges and switches that interconnect communication links and subnetworks, whereas an end station may be a computer located on one of the subnetworks.

Devices in the computer network (e.g., end station, intermediate stations, etc.), in general, communicate by exchanging discrete packets or frames of data according to predefined protocols. In this context, a protocol represents a set of rules defining how the stations interact with each other to transfer data. The traffic flowing into a network device—e.g., a router, switch, bridge, server, and the like—is generally made up of multiple abstraction layers (e.g., the Open Systems Interconnection (OSI) model). Each of these logical layers generally relates to communications functions of a similar nature. Generally, each layer is responsible for providing some service to the layer above it, and similarly each layer may use services of the layer below it. The International Standards Organization (ISO) defined seven layers as a standard for computer networks in creating the OSI model. The layers are defined as follows: (1) the physical layer, (2) the data link layer, (3) the network layer, (4) the transport layer, (5) the session layer, (6) the presentation layer, and (7) the application layer. Generally, the physical layer is responsible for transmitting unstructured bits of information across a link. The data link layer generally provides error-free transfer of data frames over the physical layer, allowing layers above it to assume virtually error-free transmission over the link. The network layer is responsible for ensuring that any pair of systems in the network can communicate with each other, while the transport layer establishes a reliable communications stream between a pair of systems. The session layer generally facilitates the establishment of sessions between processes running on different sessions, by providing functionality for session establishment, maintenance and termination, as well as session support functionality such as security, name recognition services, and so on. Additionally, the presentation layer is responsible for the delivery and formatting of application layer information, while the application layer is responsible with the transfer and manipulating application data (e.g., transferring files, mail services, and so on).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
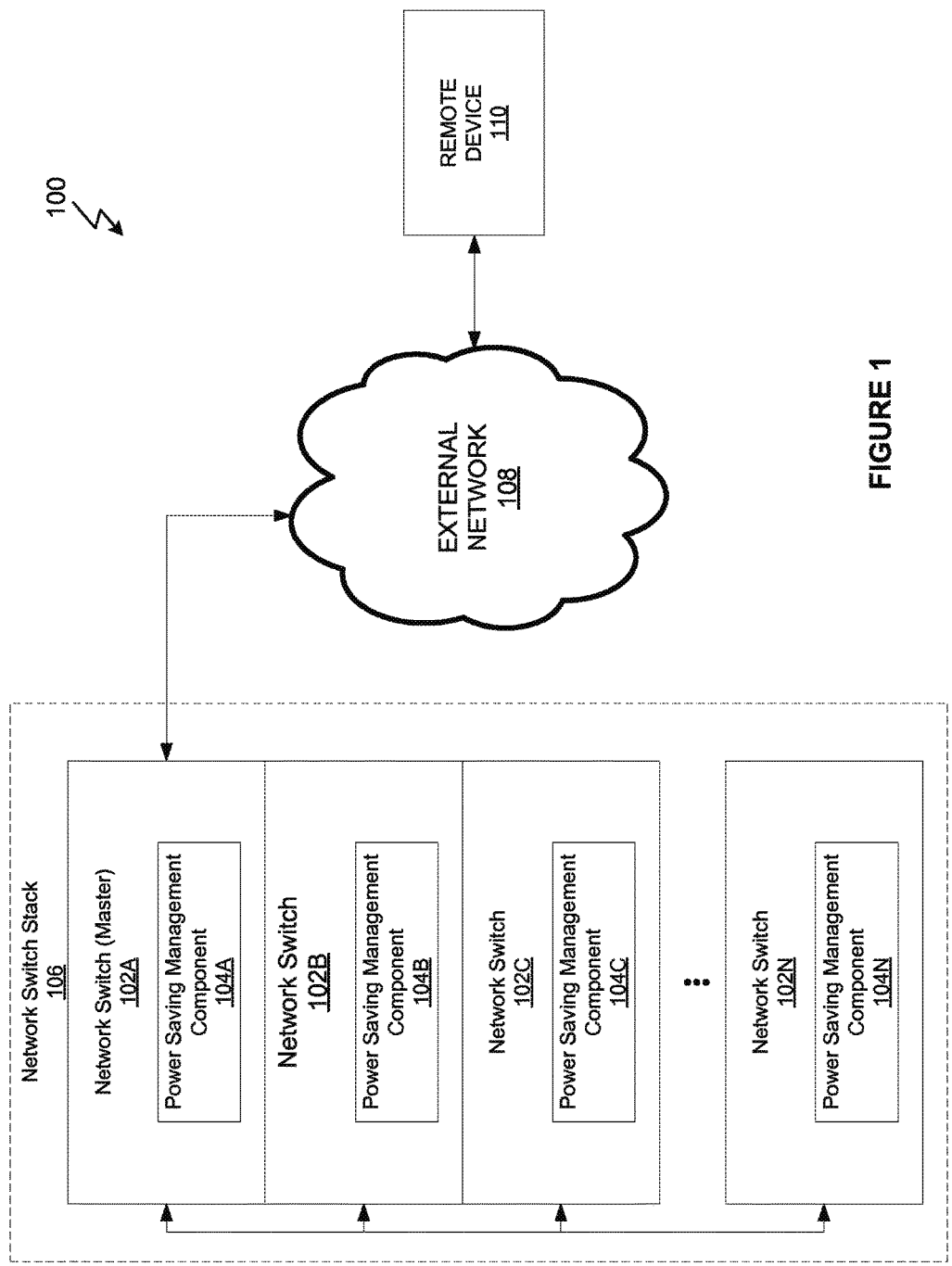
FIG. 1 illustrates an example network architecture of a plurality of network devices configured with power saving management components, in accordance with embodiments of the present disclosure.

One embodiment provides a method for entering a power saving mode at a first network device, wherein logic for processing layer 2 and higher data is inactive during the power saving mode. Additionally, the method includes receiving, while the first network device is in the power saving mode, a layer 1 (L1) bit stream from a second network device of a plurality of network devices connected to the first network device. After receiving the L1 bit stream, the method may further include, upon determining that a predefined code is present within the received L1 bit stream, exiting the power saving mode at the first network device. The method may yet further include transmitting a second L1 bit stream containing the predefined code to a third network device of the plurality of network devices.

Another embodiment provides a first switch that includes a plurality of ports, first logic and second logic. The first logic may be operable to process layer 2 and higher data received on a first port of the plurality of ports. The second logic may be operable to enter a power saving mode at the first switch, where the first logic is inactive during the power saving mode. Additionally, the second logic may be operable to receive, while the first switch is in the power saving mode, a L1 bit stream on the first port of the plurality of ports from a second switch of a plurality of switches connected to the first switch. After receiving the L1 bit stream, the second logic may further be operable to, upon determining that a predefined code is present within the received L1 bit stream, exit the power saving mode at the first switch. In addition, the first logic may be activated upon exiting the power saving mode. The second logic may yet further be operable to transmit, on a second port of the plurality of ports, a second L1 bit stream containing the predefined code to a third switch of the plurality of switches.

Still another embodiment provides a switch that includes a plurality of ports, an uplink port, and logic. The plurality of ports may be connected to a plurality of switches in a network stack and the uplink port may not be connected to the plurality of switches in the network stack. The logic may be operable to enter a power saving mode at the switch. Additionally, the logic may be operable to receive, via the uplink port, a signal designed to cause the switch to exit the power saving mode from a network device not part of the network stack. Upon receiving the signal, the logic may, in addition, be operable to exit the power saving mode at the switch; forward, via one port of the plurality of ports, a L1 bit stream containing a predefined code to at least one switch of the plurality of switches in the network stack; and continue to forward, via the one port of the plurality of ports, the predefined code until a determination is made that all switches of the plurality of switches connected to the switch have exited the power saving mode.

Example Embodiments

As computer networks continue to grow in size and complexity, the issue of reducing the power consumption of network devices is gaining increasing attention. A number of techniques exist for attempting to reduce the amount of power consumed by network devices (e.g., endpoint devices, intermediate devices, etc.) in computer networks. Certain network devices, e.g., such as switches, routers, etc., may be capable of entering a low power mode based on commands received via a command line interface (CLI). Some of the low power modes may put the entire network device to sleep when the network device is not in use, while other low power modes may put only certain parts of the network device (e.g., certain downlink ports, Application-specific integrated circuits (ASICs), etc.) to sleep when the network device (or the different parts of the network device) are not in use.

Once a network device enters the low power mode, a number of conventional techniques exist for waking up the network device. For example, one method includes waking up the network device based on a timer. The timer may be used to schedule a particular wake up time for the network device, and generally all network device components and logic not required for monitoring and reacting to the timer can be powered down during such a low power mode. Another method includes waking up the network device based on an on mode button trigger. For example, the network device may exit the low power mode upon a user (e.g., a network administrator) pressing the on mode button trigger. In such an example, substantially all network device components and logic not required for monitoring and reacting to the press of the button can be powered down during such a low power mode. These traditional techniques for waking up a network device may be satisfactory in some situations, for example, if the network device only needs to be awake at certain predetermined scheduled intervals, or if a network administrator is available on-site to manually wake up a network device. However, these traditional techniques may not be satisfactory for remotely waking up a network device on-demand.

In general, to provide remote on-demand wake up services for a network device, typically some part of the network device needs to be awake. While methods such as Wake-on-Lan (WoL) and Energy Efficient Ethernet (EEE) enable users to remotely wake up network devices, these techniques are unsatisfactory for waking up a plurality of network devices and reducing power consumption. For example, WoL and other similar techniques enable users to remotely wake up network devices by sending particular layer 2 communications to the network device. While such techniques enable remote wake up for network devices, these techniques require a significant part of the network device to be awake, as the logic for processing layer 2 communications on the network device must be functioning in order to receive and respond to the layer 2 wake up message. For example, WoL typically utilizes a layer 2 communication protocol to send network messages to turn on (or awake) a computer. In today's highly integrated systems, however, if one Ethernet port in the ASIC of a network device has to be on (e.g., in order to receive the WoL message), then substantially the entire ASIC must be operational. As a result, such techniques severely reduce the power savings of the low power mode. Moreover, the messages in EEE are typically point-to-point, and thus, as will be described below, are unsatisfactory for waking up a plurality of network devices configured in a stack where only a portion of the network devices in the stack may have access to the external network. In addition, methods such as EEE typically are used to power down individual ports, and as such, are not satisfactory for powering down an entire stack of network devices.

Increasingly, multiple individual network devices (e.g., a stack of network switches) are being used to create a single logical network device in a computer network. As will be further described with reference to FIG. 1, a number of network devices (e.g., a plurality of switches) may be grouped together in a stacked system to provide additional flexibility and management options to administrators of the computer network. Once stacked, the stack of network devices may appear to the rest of the network as a single network device. Additionally, network administrators may manage all network devices and/or ports of the stack from a single management console (e.g., provided by one of the members of the stack).

In some network switch stacks, only a portion of the individual network switches may be connected to an external network (e.g., via an uplink/Ethernet management port). For example, a network switch stack could include only a single network switch having one or more ports connected to an external communications network (e.g., the Internet). As a consequence, remote wake up commands can only be sent directly to a portion of the individual network switches within the switch stack.

As such, embodiments presented herein provide techniques for waking up a network device (e.g., a switch) or stack of network devices (e.g., stack of switches), such that a significant part of the network device or stack of network devices are powered down as part of a power saving mode. By doing so, embodiments enable network devices to significantly reduce power consumption, as compared to the amount of power typically consumed in methods such as WoL, EEE, etc., while at the same time allowing network administrators to remotely wake up the network devices on-demand.

One embodiment includes entering a power saving mode at a first network device, wherein logic for processing layer 2 (L2) and higher data is inactive during the power saving mode. While in the power saving mode, the first network device receives a layer 1 (L1) bit stream from a second network device connected to the first network device. Upon determining that a predefined code is present within the received L1 bit stream, the first network device exits the power saving mode and transmits a second L1 bit stream containing the predefined code to a third network device. Doing so in this manner allows a plurality of network devices to exit a power saving mode without utilizing an excessive amount of power (e.g., due, in part, to not utilizing layer 2 and higher data protocols) and allows a network administrator to remotely wake up the plurality of network devices on-demand.

It should be noted that although many of the following embodiments may be described with reference to a particular type of network device, e.g., switches, or stack of network devices, e.g., stack of switches, those of ordinary skill in the art will understand that the techniques described herein could also be applied to other types of network devices and/or groups of network devices capable of receiving and processing L1 communications. L1 is typically referred to as the physical layer and generally includes the following sublayers: physical coding sublayer (PCS), physical medium attachment (PMA) sublayer, and physical medium dependent (PMD) sublayer. The physical layer, in general, is responsible for the transmission and processing of raw bits (e.g., in the form of bit streams) as opposed to the transmission of packets associated with higher layers. For example, the sublayers within the physical layer, in general, are responsible for data encoding/decoding of the bits, scrambling/descrambling of the bits, and interacting with the physical medium.

FIG. 1 is a block diagram illustrating a network architecture 100 in which aspects of the present disclosure may be practiced. For example, according to various embodiments presented herein, as will be described in more detail below, techniques presented herein allow one or more of the network switches 102A-N in the network 100 to awake (or exit) from a low power mode based on a remote trigger without requiring a significant portion of the network switches 102A-N to be powered on (e.g., logic on the network switches 102A-N for processing L2 and higher communications), thereby providing improved power consumption during the low power mode.

As shown, the network 100 generally includes one or more network switches 102A-N that are able to route and support traffic exchanged in the network 100. Each of the network switches 102A-N includes a Power Saving Management (PSM) component 104A-N, respectively. The PSM component 104, in general, represents logic (e.g., a software application, device firmware, an ASIC, etc.) that is configured to implement one or more of the techniques presented herein. For example, the PSM component may be able to perform operations 400 illustrated in FIG. 4, operations 500 illustrated in FIG. 5, or any other techniques described herein.

In the depicted embodiment, the network switches 102A-N are arranged in a network switch stack 106, where the network switch stack 106 appears a single switch to the rest of the system 100 (e.g., external network 108, remote device 110, etc.). Such a network switch stack 106 may be created, for example, due to the requirements (e.g., in terms of size, capability, cost, etc.) of the computer network.

In order to create the network stack 106, the network switches 102A-N may be connected to one another, such that the switches in the network stack are capable of communicating (e.g., directly or indirectly) with one another. For instance, the network switch 102A may be connected to network switch 102B, network switch 102B may be connected to network switch 102C, and so forth, with the last switch in the stack (e.g., network switch 102N) connecting back to the first switch (e.g., network switch 102A) in order to create a ring topology (e.g., similar to embodiments shown in FIGS. 3A-3B). In such an embodiment, each of the network switches could be connected to exactly two other network switches, forming a continuous path through the network stack 106. The network switches 102A-N could be connected to each other with stack interconnect cables. The stack cables may support either unidirectional or bi-directional communication flow between the network switches.

As mentioned above, one or more network stack(s) 106 may be used within the network 100 to increase the flexibility and scalability of the network 100 and to simplify the management of the network 100. For example, the network stack 106 operates as a single network switch and has a single internet protocol (IP) address that is used by all of the network switches that are members of the stack. The network stack may be managed by a master network switch (i.e., network switch 102A in the network switch stack 106 depicted in FIG. 1) that is elected by one or more network switches that are members of the stack. The master network switch, in general, is responsible for maintaining and updating configuration files, switching/routing information, and other stack information and may be the primary point of contact for IP functions such as CLI, pings, etc.

In general, any switch that is a member of the stack may become the master switch. The process for electing a master switch typically occurs upon installation of the stack, reboot of the entire stack, etc., and may use one or more criteria for selecting a master switch from one of the member switches. For example, the one or more criteria may include a user priority, hardware and software priority, default configuration, an indication of which member switch has been running the longest, an indication of the switch with the lowest media access control (MAC) address, etc.

Referring to the embodiment illustrated in FIG. 1, for example, network switch 102A is configured to serve as the master network switch of the network stack 106, and all remaining network switches (e.g., network switches 102B-N) may serve as (subordinate) member switches of the stack. As shown, the network switch 102A is the only network switch that is connected (e.g., via an uplink/Ethernet port) to an external network 108. Of course, one of ordinary skill in the art will recognize that in other network switch stacks, more than one network switch within the stack could be connected to an external network (e.g., the Internet), and the depicted network switch stack 106 is simply one possible configuration of a switch stack of many. As will be described in greater detail below, techniques presented herein allow a network administrator (via a remote device 110) to remotely wake up the network switch 102A, along with the other members of the stack (e.g., network switches 102B-N), without requiring the entire stack interface to be powered on and connected to the external network 108.

Figure 2:
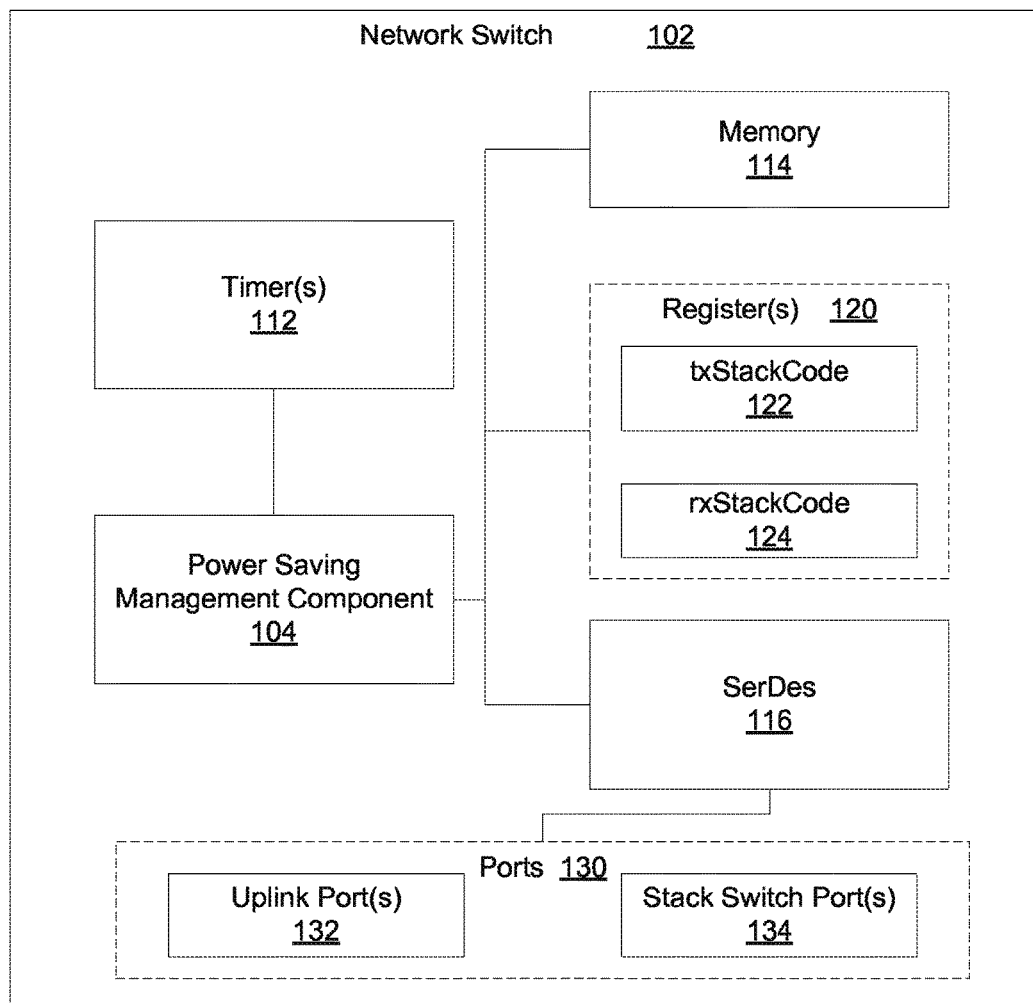
FIG. 2 illustrates a block diagram of a network switch configured with a power saving management component, in accordance with embodiments of the present disclosure.

FIG. 2 illustrates various components that may be utilized in a network switch 102, which may implement one or more of the techniques described in the present disclosure. For example, the network switch may implement the operations 400 and 500 illustrated in FIGS. 4 and 5, respectively. As shown, the network switch 102 includes a PSM component 104, one or more timers 112, memory 114, registers 120, ports 130 and a Serializer/Deserializer (SerDes) 116.

In one embodiment, the network switch 102 could be used as an edge network switch (e.g., master switch 102A that is connected to an external network 108 via an uplink port). In another embodiment, the network switch 102 could be used as a (subordinate) member switch (e.g., any of the switches 102B-N illustrated in FIG. 1). In yet another embodiment, the network switch 102 could be used as a standalone switch (i.e., a switch not a part of any network stack).

Generally, the plurality of ports 130 allows for transmission and reception of data between the network switch 102 and another network device. As shown, the ports 130 include one or more uplink ports 132 and one or more stack switch ports 134. The network switch may be connected (via one or more of the uplink ports 132) to an external network (e.g., such as external network 108 illustrated in FIG. 1) and may be able to receive L2 and higher data (in the form of packets) over the one or more uplink ports 108. The network switch may be connected (via one or more stack switch ports 134) to one or more other network switches in a network stack (e.g., such as network stack 106 illustrated in FIG. 1) and may be able to receive L1 signaling via the one or more stack switch ports 134, in accordance with the various techniques presented herein.

The SerDes 116 is coupled to the ports 130 and could be used to serialize one or more bit streams for transmission via the ports 130 or deserialize a bit stream received via the ports 130. Registers 120, which includes txStackCode register 122 and rxStackCode register 124, is coupled to SerDes 116 and could be used to temporarily store bits that may be transmitted and/or received via SerDes 116.

Memory 114, which may include read-only memory (ROM) and random access memory (RAM), provides instructions and data to PSM component 104. A portion of memory 114 may also include non-volatile RAM (NVRAM). The instructions in the memory 114 are executable to implement the various techniques described herein. In addition, the PSM component 104 can use timers 112 for determining when to perform (or stop performing) one or more actions associated with the various techniques presented herein. For example, as will be described below, the PSM component 104 could be configured to continue forwarding a L1 bit stream containing a wake up signal for a pre-determined amount of time measured by timers 112.

According to various embodiments presented herein, the PSM component 104 is generally configured to facilitate the remote wake up of a stack of network switches. In one embodiment, the PSM component 104 is configured to put a network switch (or multiple network switches) in a low power mode (or sleep mode). Instead of utilizing L2 signaling, the PSM component may instead take advantage of PCS codes typically exchanged on the L1 layer. Generally, the PCS field is an 8 bit field and only a portion of unique 8 bit values are recognized by network switches as unique PCS codes. Thus, in some embodiments, the PSM component is configured to overload the PCS field such that a wake up message (normally transmitted via L2 as in traditional methods) may pass through L1 signaling between the switches in a network stack. In order to detect whether a wake up signal is present within one or more PCS codes, the PSM component 104 can copy received PCS field values into a register (e.g., rxStackCode register 124), and can monitor the register to detect whether the register contains the predefined wake up code. Once detected, the PSM component 104 could initiate a series of operations to wake up the network switch stack. For instance, the PSM component 104 could perform an operation to wake up the network device 102 and could forward the wake up signal as a PCS field value within an L1 bit stream to another switch in the network stack. In one embodiment, the PSM component 104 is configured to detect whether all switches in the network stack are awake, and is configured to continue forwarding the L1 bit stream containing the wake up signal until all network switches within the network stack are determined to be awake.

Figure 3A:
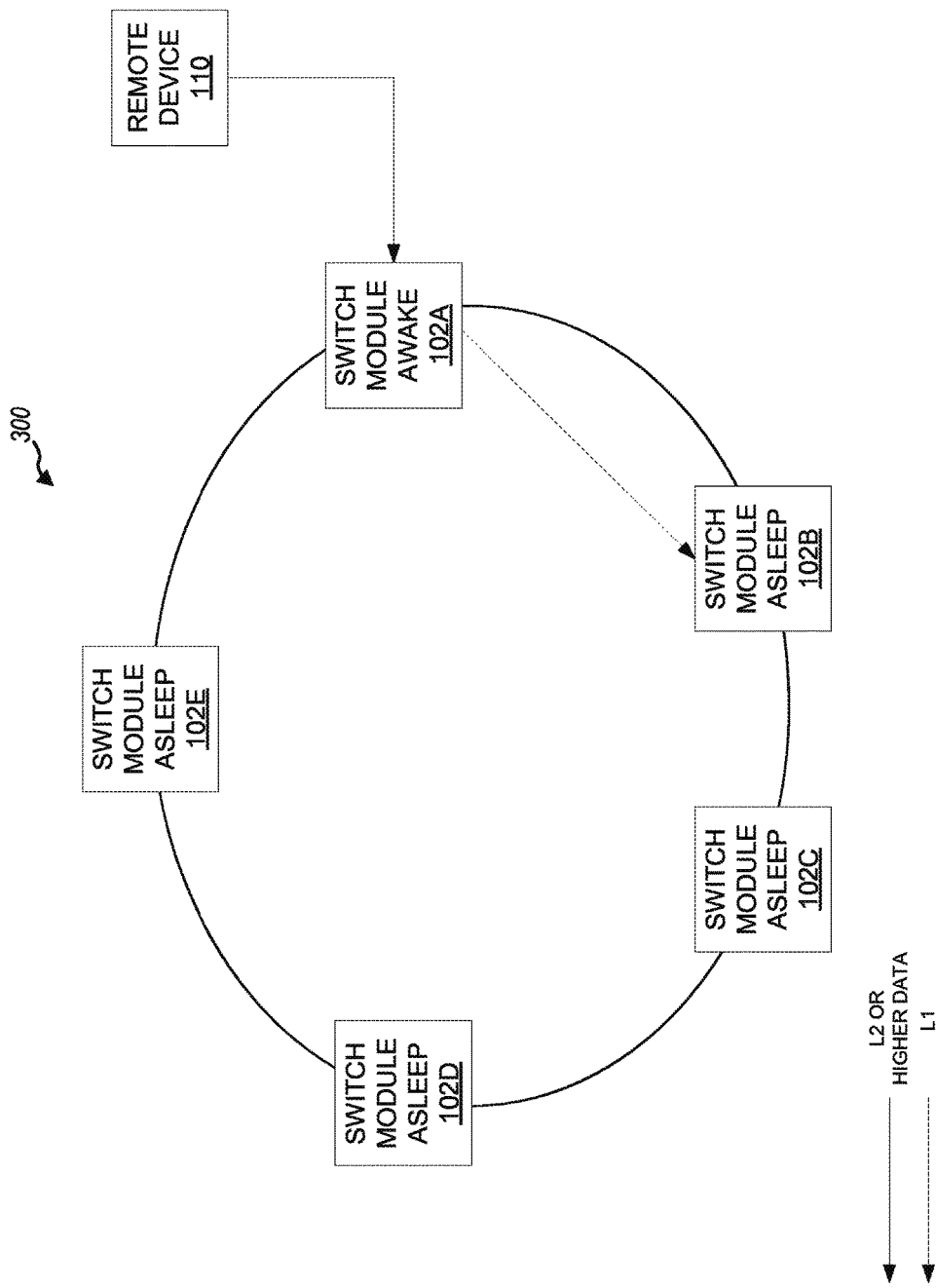
FIGS. 3A-3B illustrate an example of a topology of network switches configured in a network stack, in accordance with embodiments of the present disclosure.
Figure 3B:
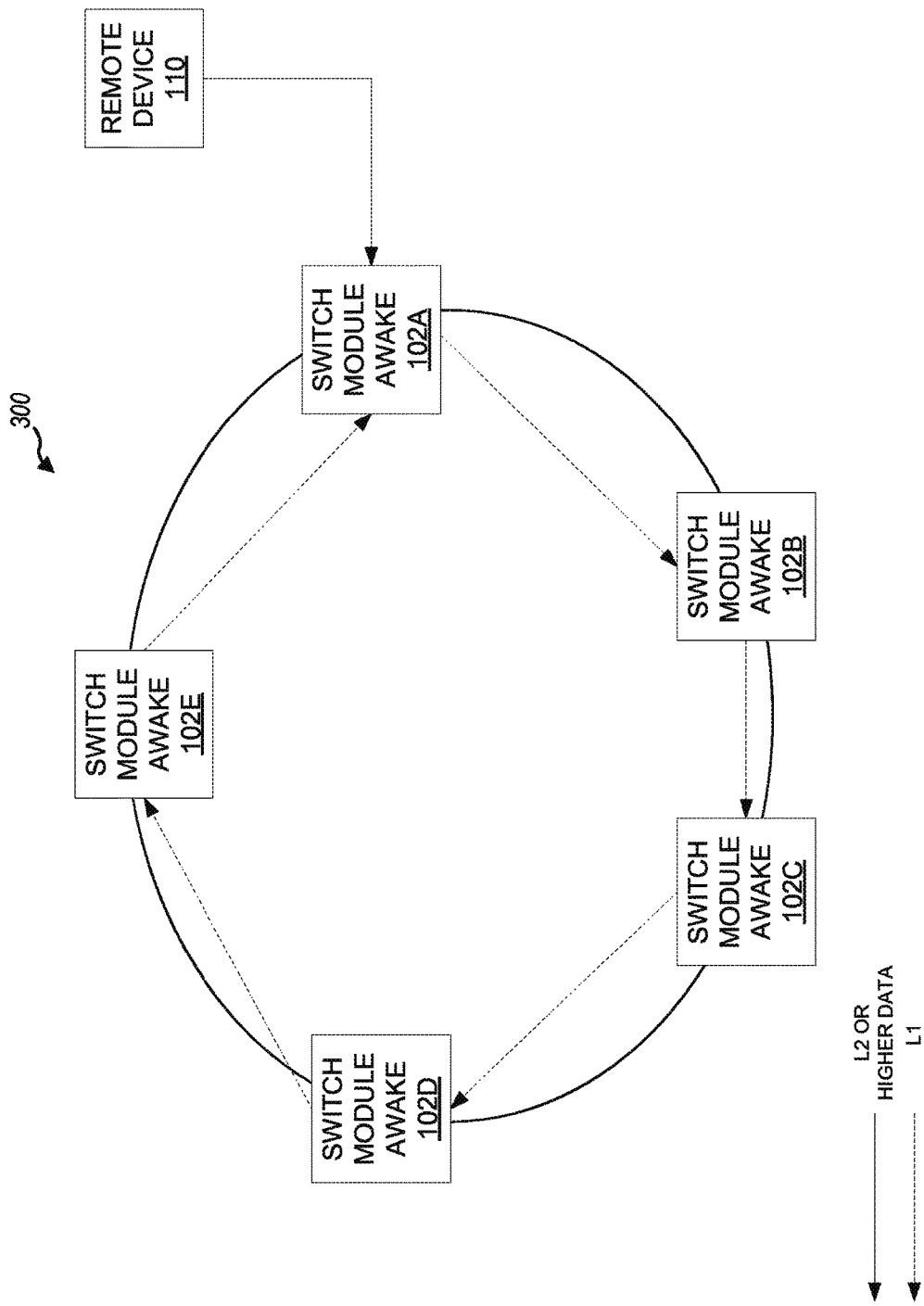

FIGS. 3A-3B illustrate a scenario of network switches in a network stack, according to one embodiment of the present disclosure, that are configured to wake up in accordance with the techniques described herein. As shown in FIG. 3A, the network 300 includes switch modules 102A-E, arranged in a ring topology. That is, each of switch modules 102A-E is connected to two other switch modules within the network stack. For example, switch module 102A is the master switch that is connected to a remote device 110 (e.g., via an uplink/Ethernet management port), while switch modules 102B-E are (subordinate) network switches that are a part of the network stack. The switch modules 102A-E could be any of the network devices illustrated in FIGS. 1-2 and 6-7.

As mentioned above, each of switch modules 102A-E includes a PSM component that is able to transmit/forward a wake up signal via L1 signaling to every switch module in the stack in order to wake up the entire stack. For example, although not shown, each of the switch modules 102A-E could be put in a low power mode or sleep mode (e.g., by the PSM component in switch module 102A). While each of the switch modules are in sleep mode, each of the switch modules may only keep a minimum number of SerDes (e.g., SerDes 116) associated with receiving, transmitting and/or processing bits received via L1 signaling powered on. For example, only the SerDes 116 associated with stack cabling used to interconnect the network switches in the network stack may be powered on, and any other components (e.g., ASICs, network interfaces for processing layer 2 and higher data, front panel connections, etc.) may be powered off. Doing so in this manner may allow for increased power saving while each of network modules are in sleep mode (e.g., as opposed to entire ASICs being powered on if layer 2 data had to be received and processed). In some embodiments, the SerDes (associated with L1 signaling) could even be toggled between a power on state and a power off state, in order to achieve even greater power savings (e.g., as compared to keeping the SerDes always powered on).

Typically, when the SerDes (e.g., when each network module) is powered on, one or more registers (e.g., txStackCode 122 and rxStackCode 124) could be used when PCS codes are transmitted/received through the SerDes. For example, the register txStackCode could be used to carry a payload (e.g., such as a wake up signal) over PCS codes. The register txStackCode contains a bit (e.g., sendStackCode) that is used to force transmission of the payload over the PCS codes. For example, when the sendStackCode bit is set, the payload within the txStackCode register is transmitted over the SerDes. In general, without the sendStackCode bit, the value in txStackCode may be ignored. In accordance with the techniques presented herein, the network switch is configured to utilize the SerDes and txStackCode register to transmit a predefined bit (e.g., called a wake up signal) as part of the payload over the PCS codes.

Anytime a network administrator wishes to remotely wake up a stack of network switches, the network administrator could send a wake up message via L2 or higher data to the master switch of the network stack. For example, as shown in FIG. 3A, upon receiving a wake up message via L2 or higher data from a remote device 110, the PSM component 104 within the switch module 102A causes the switch module 102A to exit (or awake from) a low power mode.

After the switch module 102A wakes up, the PSM component 104 within switch module 102A writes the predefined bit (e.g., wake up signal) to the txStackCode register 122 and sets the sendStackCode bit in order to force the transmission of the wake up signal over the PCS codes to switch module 102B.

The PSM component 104 within switch module 102B copies the latest received code received via L1 signaling from switch module 102A into a register (e.g., such as rxStackCode 124) and periodically polls the register (e.g., over software, hardware, etc.) in order to determine whether the wake up signal was received from switch module 102A. In some cases, the PSM component 104 could periodically poll the register over a management data input/output (MDIO) interface or peripheral component interconnect express (PCIe) interface. Upon determining that the wake up signal is present, the PSM component 104 within switch module 102B triggers the switch module 102B to exit (or awake from) low power mode and may transmit the wake up signal to another switch module (e.g., switch module 102C) in the network stack. In this manner, the wake up signal can be cascaded hop-by-hop through each switch module within the network stack until every switch module has exited (or awakened from) low power mode, e.g., as shown in FIG. 3B.

In general, the PSM component 104 does not turn off sendStackCode bit until the PSM component 104 determines that all members in the stack have awakened (or exited low power mode). That is, in some cases, with reference to FIG. 3B, for example, a switch module that subsequently receives a wake up signal after exiting low power mode could continue to forward the wake up signal until the PSM component 104 within that switch module determines that all members of the stack are awake. In some cases, the PSM component 104 could make this determination based on receiving an acknowledgment, from all members in the stack, that each member has received the wake up signal. The acknowledgement could be transmitted with L1 or higher layers. In other cases, the PSM component 104 could make the determination based on a time period (measured by one or more timers 112) that has elapsed since transmitting the wake up signal. In yet other cases, the PSM component 104 could make this determination based on a device discovery protocol (e.g., such as a stack discovery protocol). A device discovery protocol may, in general, refer to protocols that allow for the discovery of devices that are neighbors to already known devices. Once all of the switch modules in the stack are awake, the sendStackCode bit is reset and normal operation can resume.

It should be noted that although FIGS. 3A-3B illustrate a clockwise propagation of the wake up signal through each of the switch modules 102A-E, those of ordinary skill in the art will appreciate that the wake up signal may be propagated in other directions, e.g., counter-clockwise, combination of clockwise and counter-clockwise directions, etc.

Figure 4:
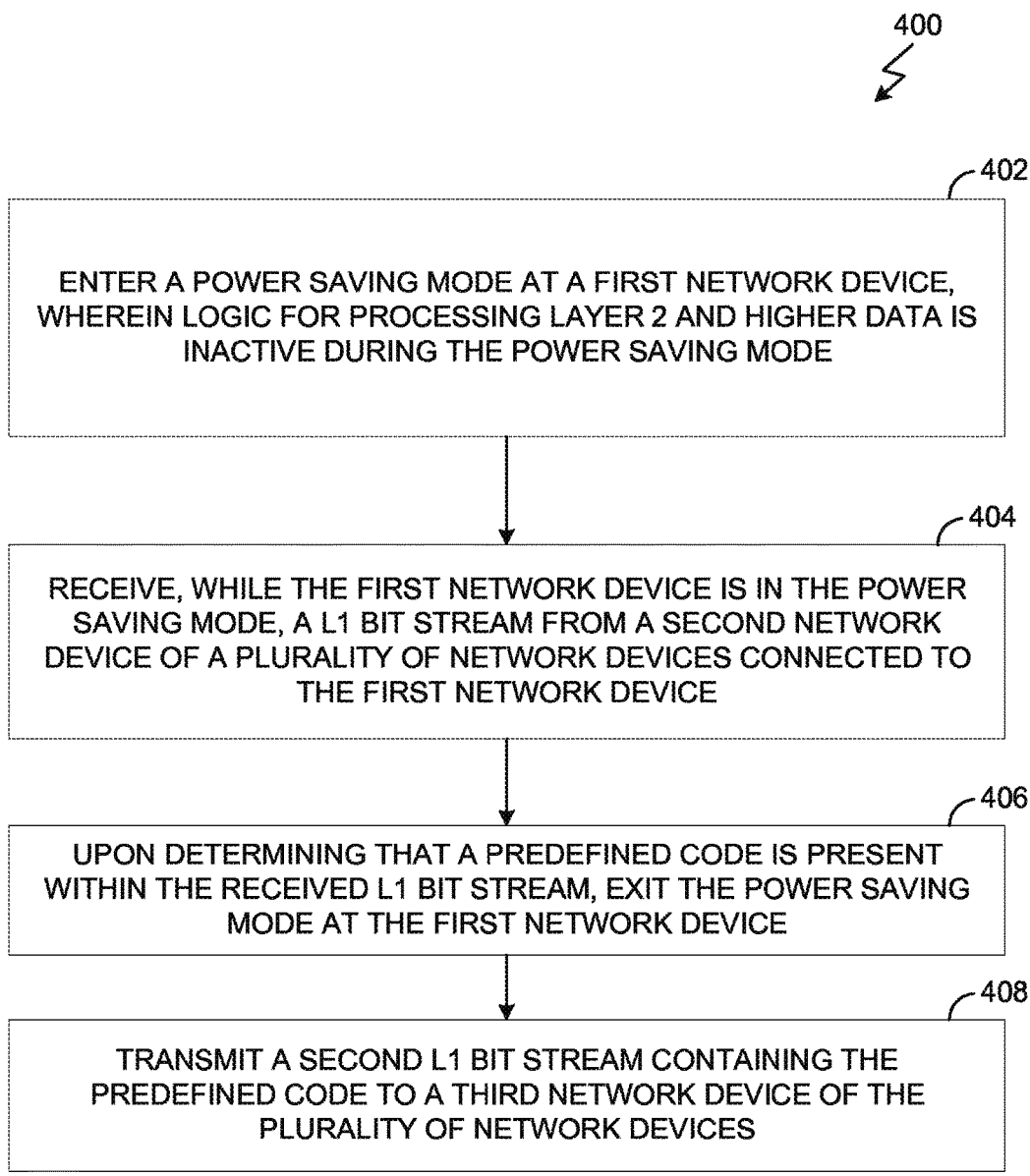
FIG. 4 is a flow diagram illustrating a method of waking up a plurality of network devices, in accordance with embodiments of the present disclosure.

FIG. 4 is a flow diagram of a method 400 for remotely waking up a stack of network switches, according to one embodiment of the present disclosure. The method 400 could be performed by the PSM component 104 within any of the switch modules not connected, via an uplink port, to an external network. As shown, the method 400 begins at block 402, where a PSM component (of a first network device) causes the first network device to enter a power saving mode (e.g., a sleep mode, low power mode, etc.), wherein logic for processing layer 2 and higher data is inactive during the power saving mode. Generally, it is contemplated that the network switch can enter the power saving mode responsive to a variety of different conditions, including (without limitation) an explicit instruction (e.g., a message received from a network administrator over a port of the network switch, a physical button press, etc.), expiration of a timer, predefined conditional logic on the network switch (e.g., workload on the network switch being less than a threshold amount of workload), and so on.

At block 404, the PSM component receives, while the first network device is in the power saving mode, a L1 bit stream from a second network device of a plurality of network devices connected to the first network device. At block 406, upon determining that a predefined code (e.g., wake up signal) is present within the received L1 bit stream, the PSM component causes the first network device to exit the power saving mode. In one embodiment, as noted above with reference to FIGS. 3A-3B, the PSM component could determine that the predefined code is present within the received L1 bit stream by writing a latest code received within the L1 bit stream to a register and monitoring the register in order to determine whether the predefined code has been written to the register (e.g., by determining whether the predefined code corresponds to the latest received code).

At block 408, the PSM component transmits a second L1 bit stream containing the predefined code to a third network device of the plurality of network devices. In one embodiment, the plurality of network devices could include a stack of network switches configured to operate as a single network switch (e.g., similar to network switch stack 106 shown in FIG. 1 and network 300 shown in FIGS. 3A-36). For example, in this embodiment, the second network device (e.g., switch module 102A) is configured to operate as a manager/master of the stack, is connected to a network uplink, and is configured to exit its power saving mode in response to receiving a wake up message over the network uplink. As noted above, the wake up message received over the network uplink could be received via L2 or higher data protocols. In other embodiments, the plurality of network devices could include a set of peer network devices (e.g., a set of peer switches not a part of a network stack).

Although not shown, in some embodiments, the method 400 could further include the PSM component receiving, at the first network device, a third L1 bit stream containing the predefined code from one of the plurality of network devices, and forwarding, upon receiving the L1 bit stream, the predefined code to another one of the plurality of network devices. The PSM component could cease the forwarding of the predefined code upon detecting that each network device of the plurality of network devices has exited the power saving mode. As noted above, in one example, the PSM component could detect that each network device has exited power saving mode, based upon the receipt of an acknowledgment, in response to the forwarding of the predefined code, from each network device of the plurality of network devices. In another example, the PSM component could detect that each network device has exited power saving mode based on determining that each network device is awake in accordance with a device discovery protocol. In yet another example, the PSM component could detect that each network device has exited power saving mode based on a time interval, measured by one or more timers, after forwarding of the predefined code. In some cases, the PSM component could also use a combination of the above techniques to perform the detection.

Figure 5:
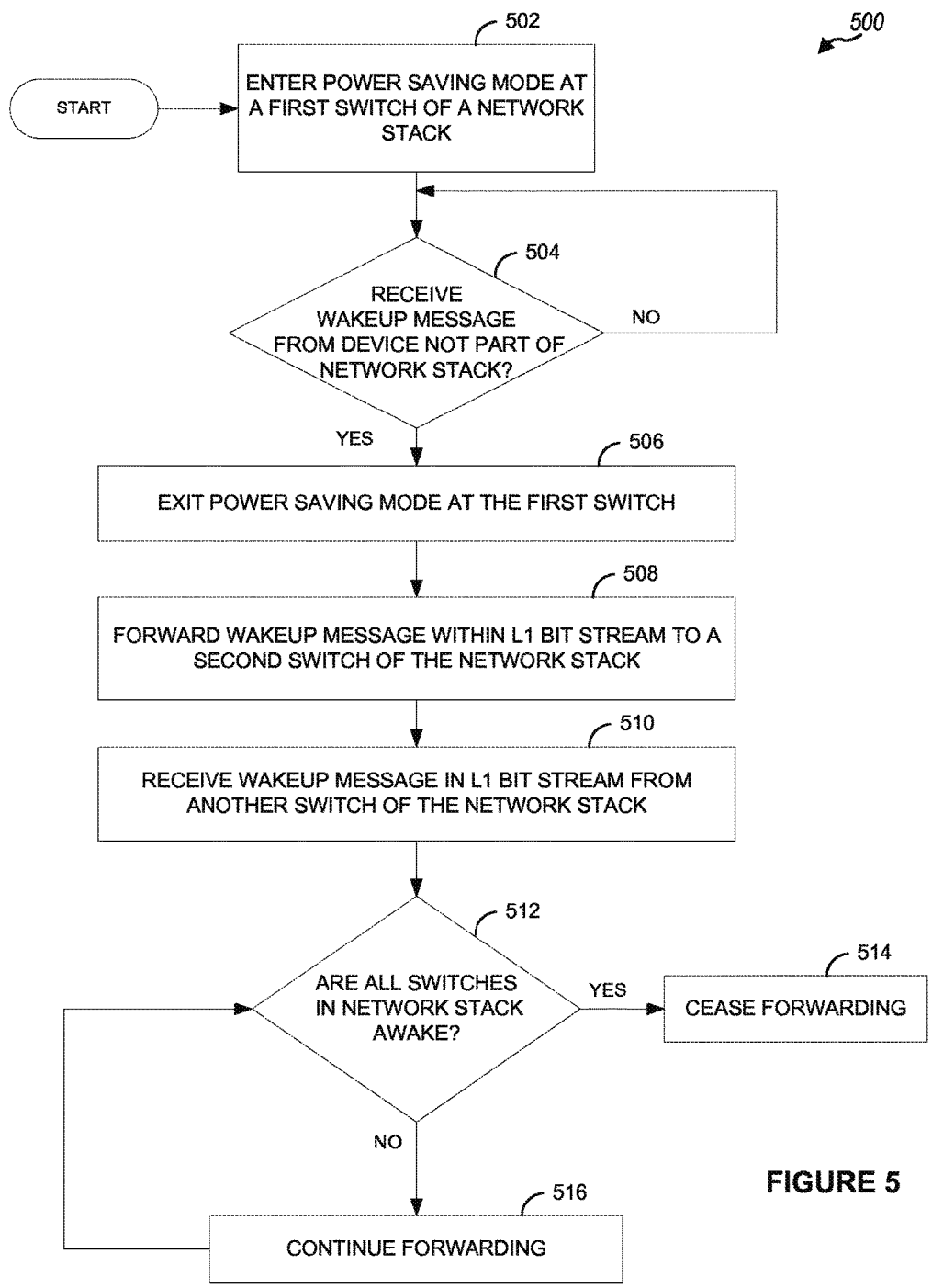
FIG. 5 is a flowchart illustrating another method of waking up a plurality of network devices, in accordance with embodiments of the present disclosure.

FIG. 5 illustrates a method 500 that may be used for remotely waking up a stack of network switches. The steps in flowchart 500 could be performed by a manager network switch (of a network stack) that is connected (via an uplink port) to an external network, such as network switch 102A shown in FIG. 1 and FIGS. 3A-3B.

The algorithm starts at step 502, where the PSM component (of a first switch of a network stack) causes the first switch to enter a power saving mode (e.g., a sleep mode, low power mode, etc.). At step 504, the PSM component determines whether a wake up message is received (via an uplink port) from a device not part of the network stack (e.g., such as remote device 110). As mentioned above, the wake up message received from the device not part of the network stack could be received via L2 and higher data protocols. If the PSM component determines that a wake up message is received from a device not part of the network stack, the PSM component proceeds to cause the first switch to exit the power saving mode (step 506), and forward a wake up message within a L1 bit stream to a second switch of the network stack (step 508).

After forwarding, the PSM component (at step 510) receives the wake up signal in the L1 bit stream from another switch of the network stack. Upon subsequently receiving the wake up signal (at step 510), the PSM component determines (at step 512), whether all switches in the stack are awake (or exited power saving mode). As noted above, this determination could be based on receiving ACKs, a device discovery protocol, timers, etc. If the PSM component determines (at step 512) that all switches in the stack are awake, the PSM component ceases forwarding of the wake up signal (at step 514). If, on the other hand, the PSM component determines (at step 512) that all switches in the stack are not awake, the PSM component continues forwarding of the wake up signal (at step 516).

Figure 6:
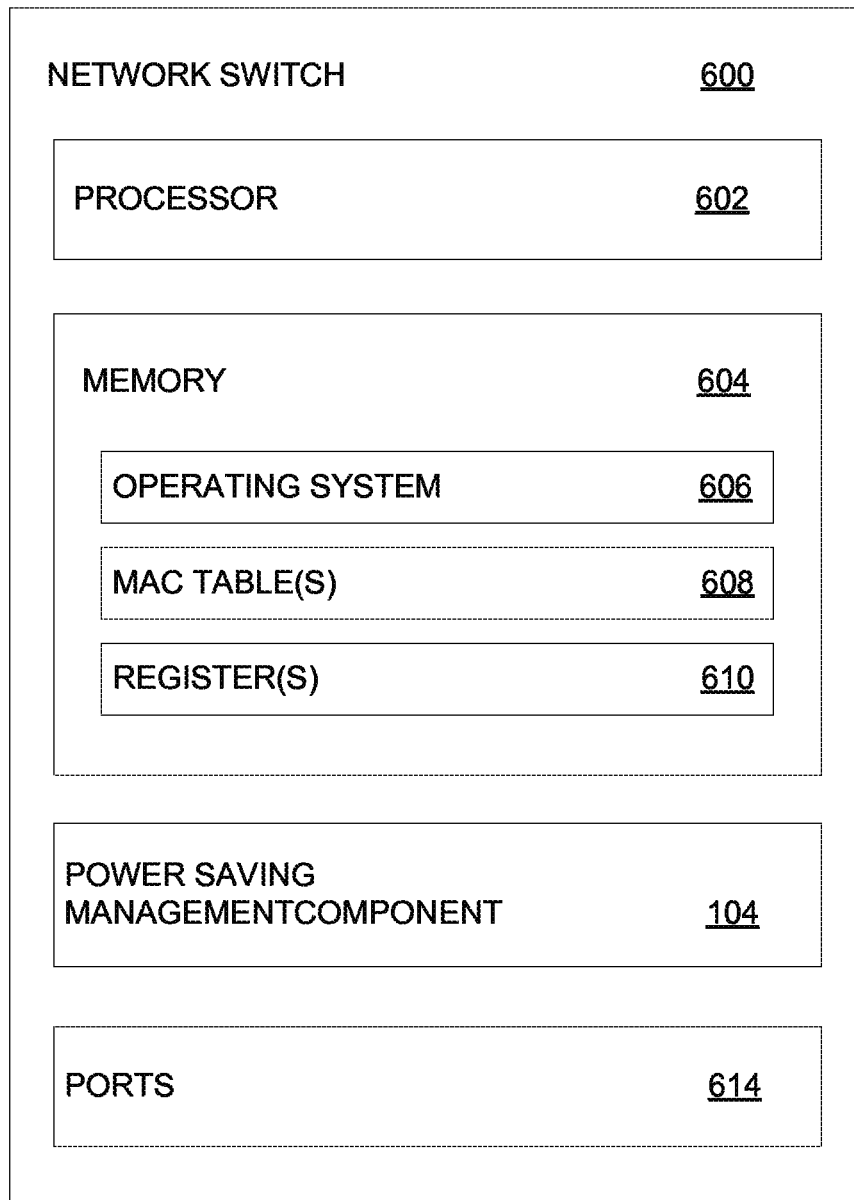
FIG. 6 is a block diagram illustrating a network switch configured with a power saving management component, in accordance with embodiments of the present disclosure.

FIG. 6 is a block diagram of a network switch configured with a Power Saving Management component, according to one embodiment described herein. The network switch 600 includes a processor 602, a memory 604, PSM component 104 and a plurality of ports 614. The plurality of ports 614 could include one or more uplink ports and one or more stack switch ports. The processor 602 may be any processing element capable of performing the functions described herein, and such a processor can represent a single processor, multiple processors, a processor with multiple cores, and combinations thereof. Of course, the depicted example is for illustrative purposes only, and it is contemplated that certain embodiments may be implemented without such processors.

The memory 604 may be either volatile or non-volatile memory and include, RAM, flash, cache, disk drives and the like. Although shown as a single entity, the memory 604 may be divided into different memory storage elements such as RAM and one or more hard disk drives. In one embodiment, the memory 604 comprises one or more static random access memory (SRAM) modules. As shown, the memory 604 includes an operating system 606, MAC table(s) 608 and registers 610. The operating system 606 generally controls the execution of application programs on the network switch 600. Examples of operating system 606 include, without limitation, versions of Cisco® IOS®, Cisco® Catalyst OS, UNIX and distributions of the Linux® operating system.

Generally, the MAC table(s) 608 represents a data structure that maps MAC addresses to ports in the plurality of ports 614. In one embodiment, the MAC table(s) 608 is stored in a ternary content addressable memory (TCAM). The registers 610 generally represent temporary storage entities that may be used in conjunction with transmission/reception of PCS codes within L1 signaling. For example, as described above, the PSM component 104 is able to copy a latest received code within L1 signaling to a register (e.g., RxStackCode register 124 shown in FIG. 2) and is able to monitor the register in order to determine if the predefined code is present.

The PSM component 104 is generally configured to enhance the amount of power that is saved by network devices in power saving mode (or low power mode), by enabling the network devices to enter a low power mode and to be awakened remotely on-demand (e.g., without a significant part of the device being powered on). For example, the PSM component is able to overload a wake up signal over a portion of PCS codes transmitted within L1 signaling, which allows other interfaces associated with processing layer 2 and higher data to power down, thus saving power and allowing devices to be awakened remotely on-demand.

Figure 7:
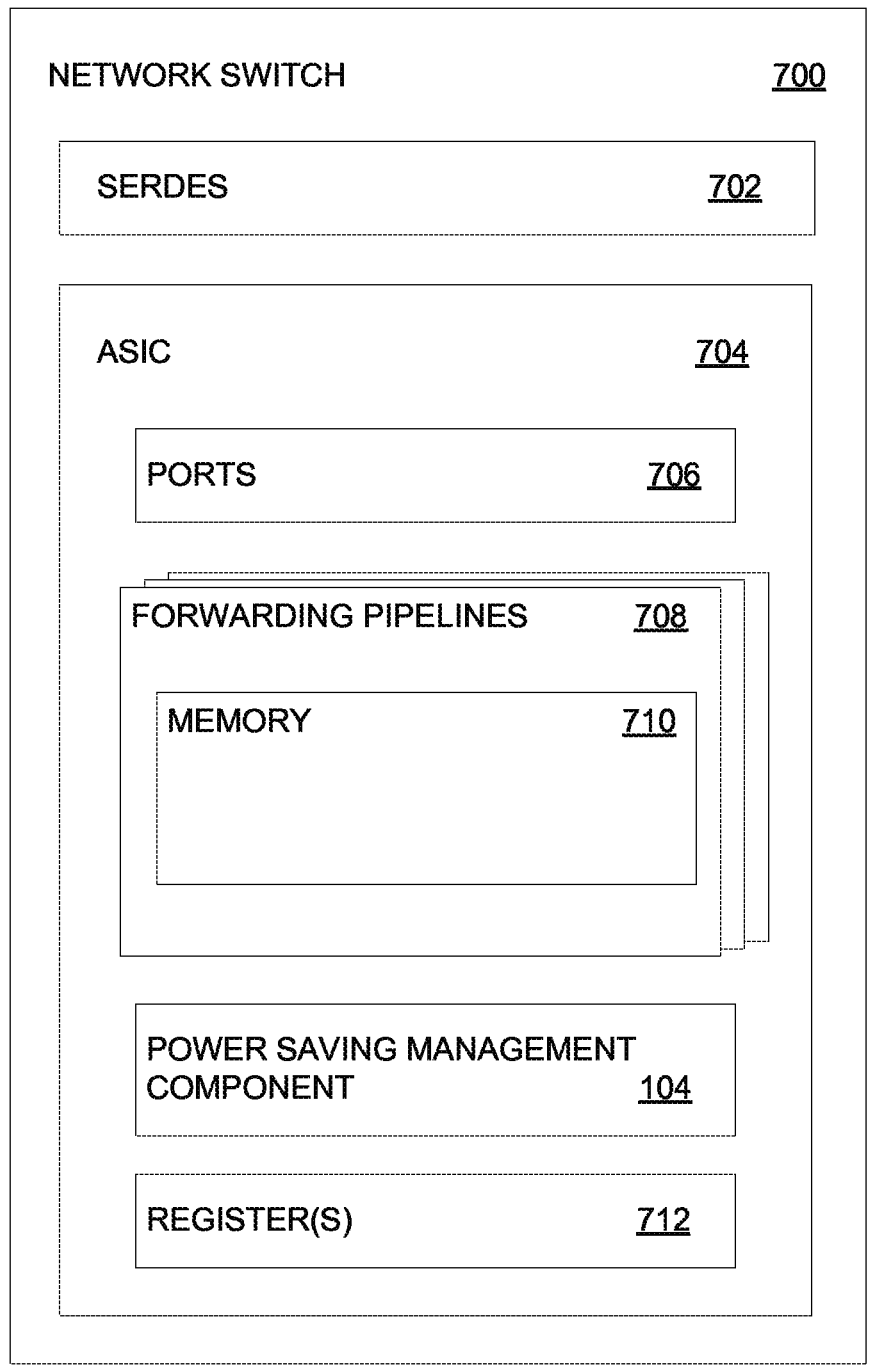
FIG. 7 is a block diagram illustrating another network switch configured with a power saving management component, in accordance with embodiments of the present disclosure.

FIG. 7 is a block diagram of a network switch configured with a Power Saving Management component, according to one embodiment described herein. The network switch 700 includes a SerDes 702, an ASIC 704, and the ASIC 704 includes a plurality of ports 706, and a plurality of forwarding pipelines 708, PSM component 104, and registers 712. In one embodiment, the network switch 700 further contains one or more processors (not shown). The processor(s) may be any processing element capable of performing the functions described herein, and such a processor can represents single processor, multiple processors, a processor with multiple cores, and combinations thereof. Of course, the depicted example is for illustrative purposes only, and it is contemplated that certain embodiments may be implemented without such processors.

Each of the forwarding pipelines 708 includes a memory 710. The memory 710 may be either volatile or non-volatile memory and include, RAM, flash, cache, disk drives and the like. Although shown as a single entity, the memory 710 may be divided into different memory storage elements such as RAM and one or more hard disk drives. In one embodiment, the memory 710 comprises one or more static random access memory (SRAM) modules.

As discussed above, the PSM component 104 is generally configured to overload a wake up signal over a portion of PCS codes transmitted within L1 signaling to allow network devices to be awakened on-demand. For example, the PSM component utilizes the SerDes 702 and registers 712 to transmit wake up signals via L1 signaling. The SerDes 702 is used to serialize/deserialize data that is transmitted and received via the plurality of ports. Moreover, the registers 712 are used to temporarily store data before/after it is utilized by the SerDes 702.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a portion of the resources may include intermediate devices, such as routers, switches, stack of switches etc., that are located in the cloud and a PSM component 104 may be able to cause the network devices located in the cloud to enter a low power mode and may be able to wake up the network devices located in the cloud on-demand, when needed. Doing so may save power that may be consumed by the resources in the cloud and may afford a network administrator more flexibility when managing resources from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    entering a power saving mode at a first network device, wherein logic for processing layer 2 and higher data is inactive during the power saving mode;
    while the first network device is in the power saving mode, receiving, at the first network device, a layer 1 (L1) bit stream from a second network device of a plurality of network devices connected to the first network device, wherein:
        the plurality of network devices comprise a stack of network switches configured to operate as a single network switch; and
        the second network device is configured to operate as a manager of the stack; and
    upon determining at the first network device that a predefined code is present within the received L1 bit stream:
        exiting the power saving mode at the first network device; and
        transmitting, from the first network device, a second L1 bit stream containing the predefined code to a third network device of the plurality of network devices, wherein the first network device and the third network device are configured to operate as member switches of the stack.

2. The method of claim 1, wherein the second network device is connected to a network uplink, and wherein the second network device is configured to exit a power saving mode at the second network device in response to receiving a wake up message over the network uplink.

3. The method of claim 1, wherein determining that the predefined code is present within the received L1 bit stream comprises:
    writing a latest code received within the L1 bit stream to a register; and
    monitoring the register in order to determine whether the predefined code has been written to the register, wherein the monitoring comprises determining whether the predefined code corresponds to the latest received code.

4. The method of claim 1, further comprising:
    receiving, at the first network device, a third L1 bit stream containing the predefined code from one of the plurality of network devices; and
    forwarding, upon receiving the third L1 bit stream, the predefined code from the first network device to another one of the plurality of network devices.

5. The method of claim 4, further comprising:
    ceasing the forwarding of the predefined code upon detecting at the first network device that each network device of the plurality of network devices has exited the power saving mode.

6. The method of claim 5, wherein detecting that each network device of the plurality of network devices has exited the power saving mode comprises:
    receiving an acknowledgement, in response to the forwarding of the predefined code, from each network device of the plurality of network devices.

7. The method of claim 5, wherein detecting that each network device of the plurality of network devices has exited the power saving mode comprises:
    determining that each network device of the plurality of network devices is awake in accordance with a device discovery protocol.

8. The method of claim 5, wherein detecting that each network device of the plurality of network devices has exited the power saving mode is based on a time interval, measured by one or more timers, after forwarding of the predefined code.

9. A first switch, comprising:
    a plurality of ports;
    first logic operable to process layer 2 and higher data received on a first port of the plurality of ports; and
    second logic operable to:
        enter a power saving mode at the first switch, wherein the first logic is inactive during the power saving mode;
        receive, while the first switch is in the power saving mode, a layer 1 (L1) bit stream on the first port of the plurality of ports from a second switch of a plurality of switches connected to the first switch, wherein:
            the plurality of switches comprise a stack of network switches configured to operate as a single network switch; and
            the second switch is configured to operate as a manager of the stack; and
        upon determining that a predefined code is present within the received L1 bit stream:
            exit the power saving mode at the first switch, wherein the first logic is activated upon exiting the power saving mode; and
            transmit, on a second port of the plurality of ports, a second L1 bit stream containing the predefined code to a third switch of the plurality of switches, wherein the first switch and the third switch are configured to operate as member switches of the stack.

10. The first switch of claim 9, further comprising:
    a register, and wherein the second logic operable to determine that the predefined code is present within the received L1 bit stream is further operable to:
        write a latest code, received via the first port of the plurality of ports, within the L1 bit stream to the register; and
        monitor the register in order to determine whether the predefined code has been written to the register, wherein the monitoring comprises determining whether the predefined code corresponds to the latest received code.

11. The first switch of claim 9, wherein the second logic is further operable to:
    upon receiving, via the first port of the plurality of ports, a third L1 bit stream containing the predefined code from one of the plurality of switches, forward the predefined code to another one of the plurality of switches; and cease the forwarding of the predefined code upon detecting that each switch of the plurality of switches has exited the power saving mode.

12. The first switch of claim 11, wherein the second logic is operable to detect that each switch of the plurality of switches has exited the power saving mode upon receiving an acknowledgement, in response to the forwarding of the predefined code, from each switch of the plurality of switches.

13. The first switch of claim 11, wherein the second logic is operable to detect that each switch of the plurality of switches has exited the power saving mode based on a stack discovery protocol.

14. The first switch of claim 11, further comprising one or more timers, wherein the second logic is operable to detect that each switch of the plurality of switches has exited the power saving mode based on a time interval, measured by the one or more timers, after the forwarding of the predefined code.

15. A switch, comprising:
a plurality of ports connected to a plurality of switches in a network stack, wherein the switch is configured to operate as a manager of the plurality of switches in the network stack;
an uplink port connected to an external network; and
logic operable to:
enter a power saving mode at the switch; and
upon receiving, via the uplink port, a signal designed to cause the switch to exit the power saving mode from a network device not part of the network stack:
exit the power saving mode at the switch;
forward, via one port of the plurality of ports, a layer 1 (L1) bit stream containing a predefined code to at least one switch of the plurality of switches in the network stack; and
continue to forward, via the one port of the plurality of ports, the predefined code until a determination is made that all switches of the plurality of switches connected to the switch have exited the power saving mode.

16. The switch of claim 15, wherein the logic is operable to receive, via the uplink port not connected to the plurality of switches in the network stack, the signal designed to cause the switch to exit the power saving mode via layer 2 or higher data.

17. The switch of claim 15, wherein the logic is operable to determine that all switches of the plurality of switches connected to the switch have exited the power saving mode upon receiving an acknowledgment, in response to the forwarding of the predefined code, from each switch of the plurality of switches.

18. The switch of claim 15, wherein the logic is operable to determine that all switches of the plurality of switches connected to the switch have exited the power saving mode based on a stack discovery protocol.

* * * * *